(12) United States Patent
Chambers et al.

(10) Patent No.: US 12,405,850 B1
(45) Date of Patent: Sep. 2, 2025

(54) SYSTEMS, METHODS, AND MEDIA FOR PROACTIVE ANALYSIS OF A COMPUTER ENVIRONMENT TO PREVENT DISRUPTION IN SERVICES

(71) Applicant: FMR LLC, Boston, MA (US)

(72) Inventors: David Chambers, Farmersville, TX (US); Sivakumar Bojan, Bangalore (IN); Saravanan Baskaran, Haslet, TX (US); Gregory O'Hearn, Flower Mound, TX (US); Surjith Kulangaroth, Kerala (IN); Nagendar Pagidimarri, Haslet, TX (US); Mahesh Kumar Padhmanabhan, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/594,538

(22) Filed: Mar. 4, 2024

(51) Int. Cl.
*G06F 11/07* (2006.01)
*G06F 11/00* (2006.01)

(52) U.S. Cl.
CPC ........ *G06F 11/0793* (2013.01); *G06F 11/008* (2013.01); *G06F 11/0766* (2013.01)

(58) Field of Classification Search
CPC . G06F 11/0793; G06F 11/008; G06F 11/0766
See application file for complete search history.

(56) References Cited

U.S. PATENT DOCUMENTS

2024/0080329 A1* 3/2024 Reed .................... G06F 16/9038
2024/0386132 A1* 11/2024 Ezra ...................... G06F 16/285

\* cited by examiner

*Primary Examiner* — Jigar P Patel
(74) *Attorney, Agent, or Firm* — Cesari and McKenna, LLP

(57) ABSTRACT

Techniques are provided for proactive analysis of a computer environment to prevent a disruption in services. Specifically, a risk score may be generated for each of a plurality of different alerts. If the risk score generated for a particular alert meets a predefined criterion, the alert may be amplified to determine a remediation for the computer environment. Specifically, an alert with a risk score that meets a predefined criterion may be amplified to determine one or more remediations that can be implemented to proactively prevent a future and potential disruption in services in a computer environment. For example, a service process that has a greatest utilization at a particular storage resource, e.g., storage array, may be identified. One or more query scripts may then be executed within the database using the particular storage resource to identify a remediation that can be implemented to prevent a potential future disruption in services.

20 Claims, 8 Drawing Sheets

| ID | Plan Hash Value | Execs | ETIME exec |
|---|---|---|---|
| AABB | 2217851470 | 9 | .281 |
| AABB | 1085227690 | 1 | 3.461 |
| AABB | 405112294 | 2 | 3.501 |
| AABB | 281550636 | 2 | 4.225 |
| AABB | 193285289 | 2 | 4.232 |

FIG. 7

SYSTEMS, METHODS, AND MEDIA FOR PROACTIVE ANALYSIS OF A COMPUTER ENVIRONMENT TO PREVENT DISRUPTION IN SERVICES

BACKGROUND

Technical Field

The present disclosure relates generally to computer environments, and more specifically to techniques for proactively analyzing a computer environment to prevent a disruption in services.

Background Information

Modern enterprises are data driven and their success is often tied to the stability and high performance of the enterprise environment (e.g., storage environment) that is responsible for efficiently and securely storing, managing, and providing access to its data. To maintain stability and high performance of the enterprise storage environment, it is integral to monitor the activities that take place in the storage environment. For example, the storage environment can be monitored to identify high input/output (I/O) workloads that might cause issues within the storage environment. Such issues, which may collectively be referred to as disruption in services, may include, but are not limited to, latency issues, crashes, unanticipated or unexpected behaviors, etc.

In many instances, the I/O workloads that have these types of negative impacts are related to storage resource queries, such as database read and write requests. It can be beneficial to identify those I/O workloads that are not currently causing issues but may potentially cause disruption in services in the future. For example, a high incoming workload to a storage resource (e.g., storage array) can have a snowball effect in the storage environment. Specifically, the high incoming workload may be caused by over utilization of the array by one or multiple hosts, which in turn would consume all the array's resources. As a result, there would be a higher probability that other hosts that are provisioned at the same array would be negatively impacted. Therefore, if the issue can be identified beforehand (i.e., proactively), a remediation plan can be implemented before the other hosts are negatively impacted such that a future disruption in services can be avoided.

To correctly identify I/O workloads that may potentially cause future disruption in services is no easy task. Specifically, conventional and current practices typically require that multiple divisions/groups (e.g., storage operations division, storage performance division, database performance division, etc.) of the enterprise, each with their own expertise, collaboratively analyze the I/O workloads to correctly identify those I/O workloads that may potentially cause a future disruption in services. This can be extremely time consuming, inefficient, and result in a disruption in services within the storage environment until the workload is identified and remediated.

Therefore, what is needed is a technique that efficiently and accurately identifies and remediates those workloads that may potentially cause issues in a computer environment such that future disruption in services can be avoided.

SUMMARY

Techniques are provided for proactive analysis of a computer environment to prevent a disruption in services according to the one or more embodiments as described herein. Specifically, and as will be described in further detail below, an alert with a risk score that meets a predefined criterion may be amplified to determine one or more remediations that can be implemented to proactively prevent a future and potential disruption in services within a computer environment. In an embodiment, the disruption in services may be related to access of a storage array of a computer environment, access of a database of a computer environment, or access of a combination of a storage array and database of a computer environment. In an embodiment, the computer environment may be a cloud based environment and the disruption in services may be related to access to cloud based storage and/or cloud based services.

In an embodiment, a software module (e.g., a proactive analysis module) executed by a processor may obtain one or more alerts, where each alert may provide an indication of at least one input/output (I/O) workload in a computer environment. The obtained alerts may be any of a variety of different alerts that can be generated by any conventional and existing alert generation system.

The software module may generate, for each obtained alert, a risk score using a risk algorithm that considers a plurality of risk factors. The risk factors used for the risk algorithm may include, but are not limited to, (1) whether an alert relates to a storage resource of a production or non-production environment, (2) whether the storage resource and/or host associated with the alert was escalated for attention in the last 24 hours or not, (3) whether there was any latency impact on the storage resource associated with the alert, (4) was the alert ongoing and active for at least 30 minutes or not, (5) was the alert generated during business hours or not, and (6) was the alert associated with an internal application or a client facing application.

If the risk score for a particular alert meets a predefined criterion, the software module may determine that the particular alert should be amplified to determine/identify a remediation that can be implemented to prevent a future disruption in services in the computer environment. Specifically, the software module may identify a host identifier corresponding to the particular alert. Moreover, the software module may identify a service process executed in a timeframe that is based on a timestamp of the particular alert, where the service process has a greatest utilization for a particular storage resource of the computer environment.

The software module may use the host identifier and an identifier for the particular storage resource to generate query scripts that may be executed for the particular storage resource. The execution of the query scripts may result in the generation of script outputs that provide information regarding different statements that are issued from the host to the particular storage resource. The software module may then automatically determine a remediation, from the script outputs, which can be implemented to prevent a future disruption in services in the computer environment. For example, the remediation may be a query plan, of a plurality of different query plans, which should be used when issuing a particular request from the host to the particular storage resource. Optionally, the software module may automatically implement a particular remediation.

BRIEF DESCRIPTION OF THE DRAWINGS

The description below refers to the accompanying drawings, of which:

FIG. 7 is an example script output that includes a plurality of different query plans for a storage resource according to the one or more embodiments as described herein.

DETAILED DESCRIPTION OF AN ILLUSTRATIVE EMBODIMENT

Figure 1:
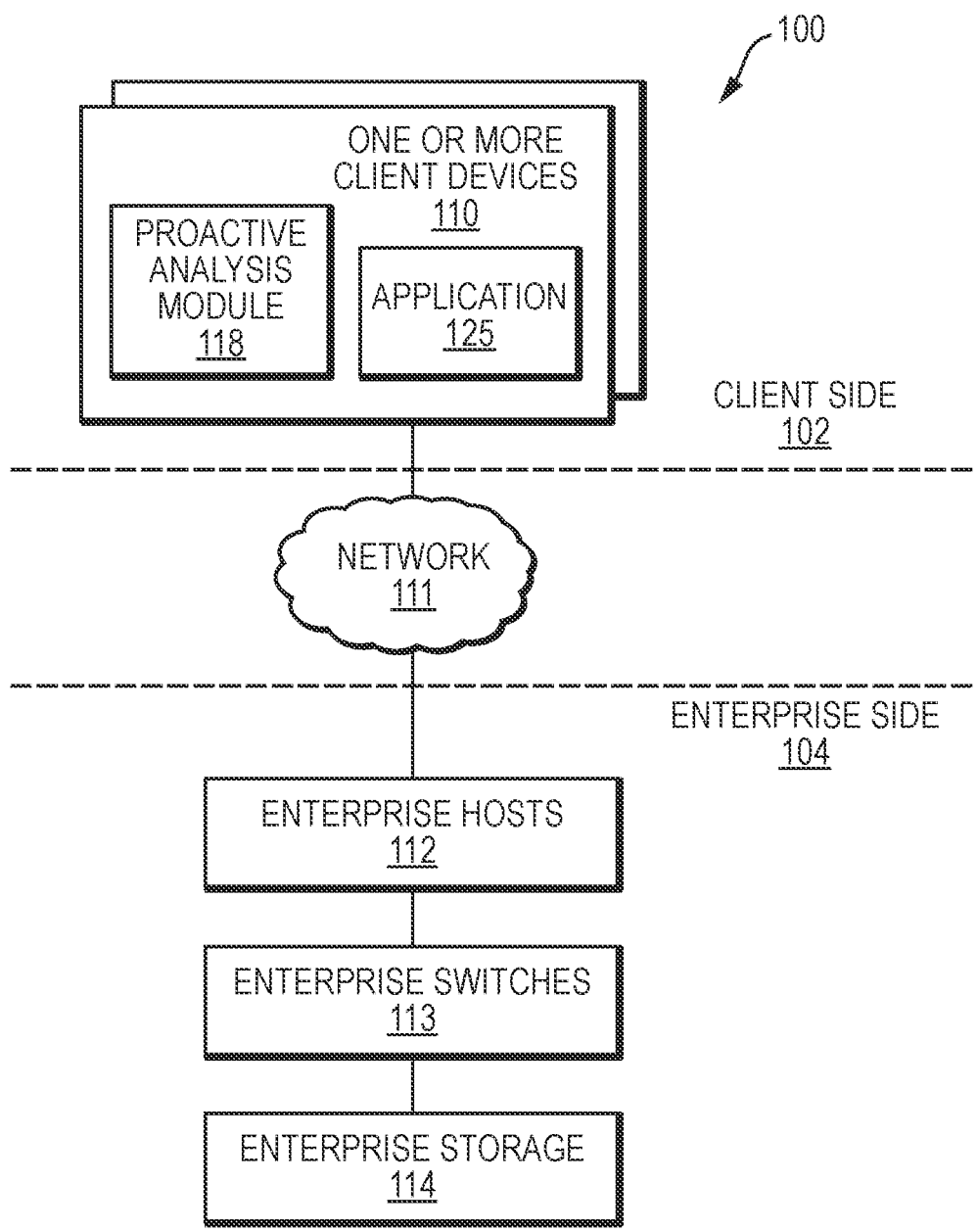
FIG. 1 is a high-level block diagram of an example system architecture for proactive analysis of a computer environment to prevent a disruption in services according to the one or more embodiments as described herein.

FIG. 1 is a high-level block diagram of an example system architecture 100 for proactive analysis of a computer environment to prevent a disruption in services according to the one or more embodiments as described herein. The system architecture 100 may be divided into a client side 102 that includes one or more local client devices 110 that are local to end users, and an enterprise side 104 that includes one or more remote devices 120.

Enterprise side 104 may be managed, operated, and maintained by an enterprise. In an embodiment, the enterprise of enterprise side 104 may be a financial services institution. It is expressly contemplated that the one or more embodiments as described herein are applicable to any of a variety of different types of enterprise systems that may be managed, operated, and/or maintained by any of a variety of different types of enterprises that may provide any types of services. As such, the reference herein to a financial services institution that provides financial services functions is for illustrative purposes only.

The enterprise side 104 may include enterprise hosts 112, enterprise switches 113, and enterprise storage 114. The enterprise side 104 of system architecture 100 may be referred to as a computer environment, and the one or more embodiments as described herein may perform proactive analysis/intervention for the computer environment as will be described in further detail below.

According to the one or more embodiments as described herein, each computing device, e.g., enterprise hosts 112, enterprise switches 113, and enterprise storage 114, may be computer hardware, computer software, or a combination of computer hardware and computer software. In an embodiment, the enterprise hosts 112, enterprise switches 113, and enterprise storage 114 may be one or more cloud-based devices. In an embodiment, the enterprise hosts 112, enterprise switches 113, and enterprise storage 114 may operate as a storage area network (SAN).

In an embodiment, the enterprise hosts 112 may be a plurality of different servers. For example, the enterprise hosts 112 may be physical and/or virtual servers. The enterprise hosts 112 may receive a query (e.g., read/write request) from client device 110, service the query by communicating with enterprise storage 114 through enterprise switches 113, and provide results back to client device 110. In an embodiment, the enterprise hosts 112 may store a Database Management System (DBMS). The DBMS may include an optimizer that may determine a most efficient execution plan for a query, e.g., SQL statement, based on a structure of the query, available statistical information about underlying objects of the computer environment, and execution steps. The optimizer may generate different execution plans based on the available information, where each plan may have a different effect on the environment.

The enterprise storage 114 may include one or more storage devices. In an embodiment, the one or more storage devices may include one or more databases (DBs) that may, for example, be organized as storage arrays. Although the examples as described herein may refer to DBs and/or storage arrays, it is expressly contemplated that the one or more embodiments as described herein are applicable to any of a variety of different storage devices that store data that can be accessed.

The enterprise switches 113, also known as fabric switches, may perform any of a variety of different functions as known by those skilled in the art. For example, the enterprise switches 113 may manage traffic flow (e.g., data packets) between the enterprise hosts 112 and enterprise storage 114.

The client side 102 may include one or more local client devices 110. According to the one or more embodiments as described herein, each client device 110 may include processors, memory, a display screen, and/or other hardware (not shown) for executing software, storing data, and/or displaying information. The one or more client devices 110 may provide a variety of user interfaces and non-processing intensive functions.

For example, a local client device 110 may provide a user interface for receiving user input and displaying output according to the one or more embodiments as described herein. The user interface can be a graphical user interface or a command line interface. In an embodiment, the client device 110 may be a server, a workstation, a platform, a mobile device, a network host, or any other type of computing device.

The client device 110 may be operated by affiliates of the enterprise, e.g., employees or customers of the enterprise, to perform enterprise functions. In an embodiment, client device 110 may download and execute application 125. In an embodiment, the execution of application 125 may allow the affiliates of the enterprise to implement one or more functions associated with the enterprise. The client device 110 may communicate with the enterprise side 104, managed/operated by the enterprise, over network 111.

The client device 110 may also include proactive analysis module 118 that may implement the one or more embodiments as described herein. For example, and as will be described in further detail below, the proactive analysis module 118 may generate a risk score for each of a plurality of different alerts, which may be generated in a conventional manner and that may be indicative of the input/output (I/O) workloads at enterprise storage 114. If a risk score meets a predefined criterion (e.g., exceeds a threshold value or is a highest risk score), the proactive analysis module 118 may determine that the corresponding alert requires proactive analysis and/or remediation. Stated another way, the proactive analysis module 118 may determine that the corresponding alert requires amplification to determine how a potential and future disruption in services, at the computer environment, can be avoided.

To that end, and as will be described in further detail below, the proactive analysis module 118 may, based on a particular alert, identify a service process for a host (e.g., server) that has a greatest utilization at a particular storage resource, e.g., storage array. The proactive analysis module 118 may execute one or more query scripts at the particular storage resource to identify a remediation that can be implemented to prevent a potential and future disruption in services at enterprise side 104 that includes enterprise hosts 112, enterprise switches 113, and enterprise storage 114.

In an embodiment, only authorized personnel of the enterprise can execute the proactive analysis module 118 to implement the one or more embodiments as described herein. For example, authorized personnel of the enterprise may utilize client device 110 to execute proactive analysis module 118 to implement one or more embodiments as described herein.

Figure 2:
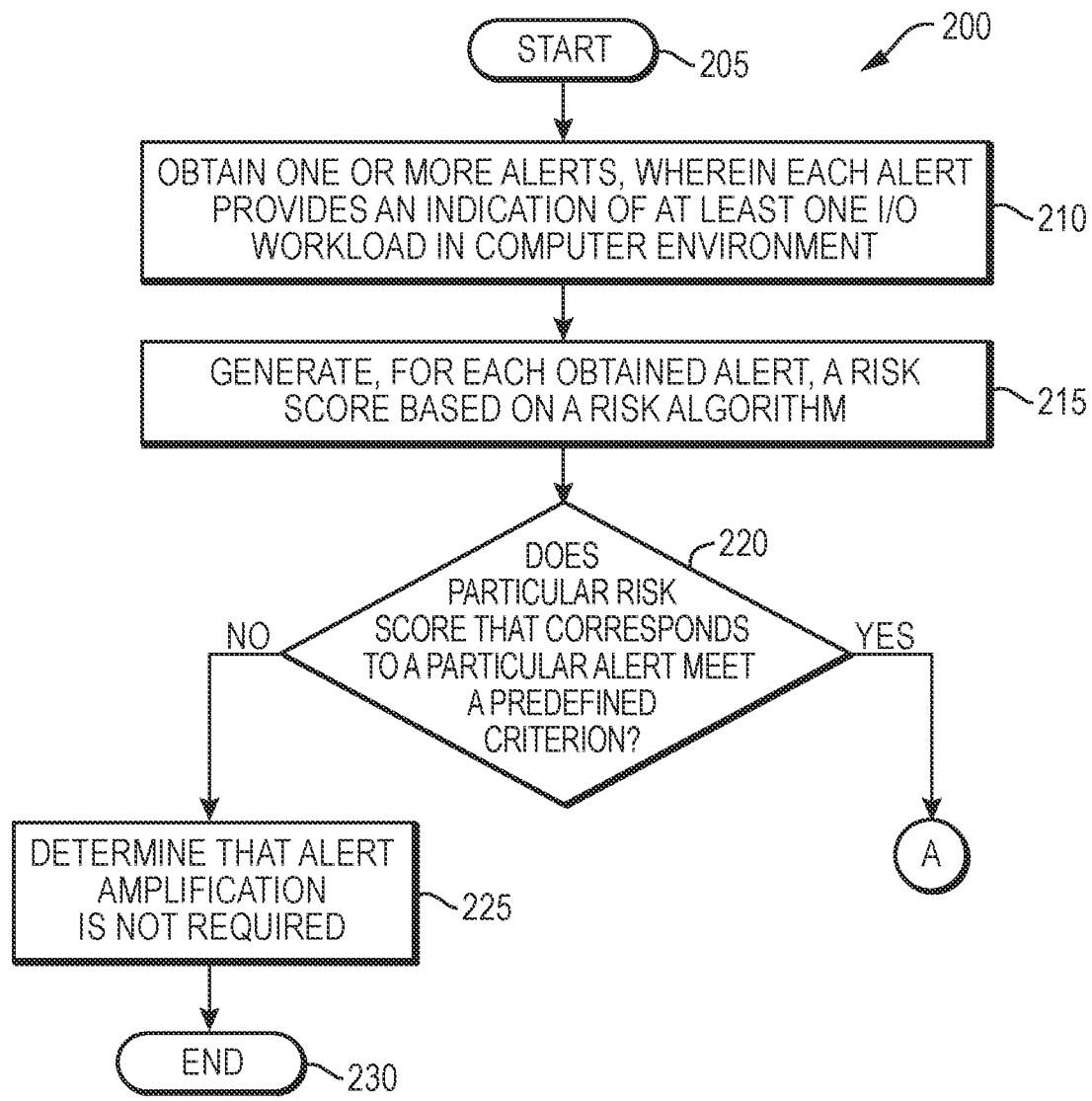
FIG. 2 is a flow diagram of a sequence of steps for determining if proactive analysis of a computer environment is required according to the one or more embodiments as described herein.

FIG. 2 is a flow diagram of a sequence of steps for determining if proactive analysis of a computer environment is required according to the one or more embodiments as described herein. Procedure 200 starts at step 205 and continues to step 210. At step 210, the proactive analysis module 118 obtains one or more alerts, wherein each alert provides an indication regarding at least one I/O workload in computer environment.

In an embodiment, the proactive analysis module 118 may collect, i.e., obtain, alerts from one or more alert generation systems at a predefined time interval. The predefined time interval may be every 5 minutes, every 10 minutes, or some other time interval. In an embodiment, the alerts may be active storage alerts that include, but are not limited to, active storage read throughput alerts and active storage write throughput alerts. In addition or alternatively, the alert may be based on a change in read or write behavior that is associated with the alert (also known as an anomaly) even if the alert does not cross a static threshold.

The one or more alert generation systems, which generate the alerts that are obtained by the proactive analysis module 118, may be any of a variety of different alert generation systems as known by those skilled in the art. Although reference may be made to particular alert generation systems, it is expressly contemplated that the proactive analysis module 118 may obtain any of a variety of different alerts that are generated by any of variety of different alert generation systems. In an embodiment, an alert may indicate or quantify an I/O workload directed to data that is stored at the enterprise storage 114, e.g., a storage array of enterprise storage 114. Further, and in an embodiment, an alert may indicate whether the I/O workload is currently impacting latency and/or performance at the enterprise storage 114.

Figure 3:
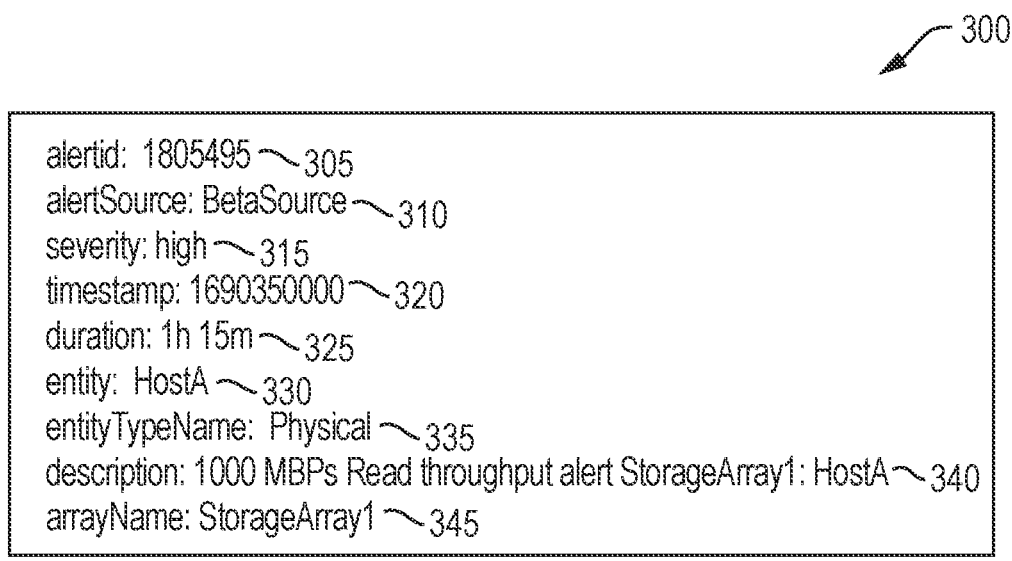
FIG. 3 is an example alert that may be obtained by the proactive analysis module according to the one or more embodiments as described herein.

FIG. 3 is an example alert that may be obtained by the proactive analysis module 118 according to the one or more embodiments as described herein. Alert 300 includes a plurality of example fields 305-345 that provide information regarding an alert and/or information related to computer environment, e.g., enterprise side 104, for which the alert is generated. As depicted in FIG. 3, alertid field 305 of alert 300 includes an alert identifier that uniquely distinguishes alert 300 from other alerts that may be obtained by proactive analysis module 118. AlertSource field 310 may include a source identifier that identifies the system that generated the alert.

Timestamp field 320 may include an identifier that indicates a date and time on which the alert was generated. In this example, the timestamp field 320 stores a Unix value that indicates that the alert was generated on Wed Jul. 26, 2023 05:40:00 GMT. Duration field 325 may include an identifier that indicates the length of time the alert lasted. In this example, the alert 300 lasted one hour and fifteen minutes. Entity field 330 may include an identifier that identifies an enterprise host 113, e.g., server, which is related to the alert. In this example, the host identified in entity field 330 is HostA, indicating that alert 300 was generated based on a request from HostA. EntityTypeName field 335 may include an identifier that indicates a type of the entity that is indicated in field 330. For example, the EntityTypeName field 335 may indicate whether the HostA is a physical entity, e.g., physical server, or a virtual entity, e.g., virtual server. ArrayName field 345 may include an identifier that identifies the storage device of enterprise storage 114 for which the alert is generated. In this example, ArrayName field 345 indicates that StorageArray1 is the name of the storage array for which alert 300 is generated.

In this example, description field 340 indicates that StorageArray1 of enterprise storage 114 experienced 1000 Megabytes per second (Mbps) of read throughput via HostA, which resulted in the generation of alert 300. Severity field 315 includes an identifier that quantifies the severity of alert 300. In the example of FIG. 3, the severity field 315 indicates that the severity of the alert is high. Therefore, the issue that resulted in the generation of alert 300 may greatly impact latency and/or performance of StorageArray1. Although the example of FIG. 3 indicates that the severity is high, it is expressly contemplated that severity field 315 may store a different identifier such as, but not limited to, low, medium, etc. Although alert 300 includes particular fields and values, it is expressly contemplated that an alert obtained by proactive analysis module 118 may include different or additional fields that include information relating to an alert that is generated for a computer environment according to the one or more embodiments as described herein.

Referring back to FIG. 2, the procedure 200 continues from step 210 to step 215. At step 215, the proactive analysis module 118 generates a risk score for each obtained alert using a risk algorithm.

As will be described in further detail below, the information from a generated alert, e.g., alert 300, may be utilized to generate a risk score that can be used to determine whether proactive analysis is required to prevent a future potential disruption in services at enterprise side 104. This risk score may be a value on a scale between a lower range value and an upper range value, inclusive of the range values. In an embodiment, the risk score may be a value in a range between 0 and 100, inclusive of 0 and 100.

The risk score may provide an indication regarding whether an alert is likely to cause a future potential disruption in services at enterprise side 104. A lower risk score may indicate that a future disruption in services at enterprise side 104 is less likely, while a higher risk score may indicate a future disruption in services at enterprise side 104 is more likely. As such, an increasing risk score indicates that a future disruption in services at enterprise side 104 is more likely to have a noticeable negative impact. As will be described in further detail below, a risk score that meets a predefined criterion can indicate that a future disruption in services is likely such that the alert should be amplified so that proactive analysis and/or remediation can be performed for enterprise side 104.

In an embodiment, the proactive analysis module 118 may determine a risk score based on the execution of a risk algorithm. The risk algorithm may be based on consideration of a plurality of different risk factors that may include, but are not limited to, (1) whether an alert relates to a storage resource of a production or non-production environment, (2) whether the storage resource and/or host associated with the alert was escalated for attention in the last 24 hours or not, (3) whether there was any latency impact on the storage resource associated with the alert, (4) was the alert ongoing and active for at least 30 minutes or not, (5) was the alert generated during business hours or not, and (6) was the alert associated with an internal application or a client facing application.

According to the one or more embodiments as described herein, each risk factor may be one of two different options, and the proactive analysis module 118 may assign a different numerical value to each of the two options. For example, the proactive analysis module 118 may assign a numerical value of +20 when an alert relates to a storage resource of a production environment and may also assign a numerical value of 0 when the alert relates to a storage resource of a non-production environment.

According to the one or more embodiments as described herein, information contained in a generated alert and/or related to the generated alert may be utilized to determine what numerical value should be used for each risk factor. For example, if the information contained in an alert indicates that the alert is associated with a production environment, then the proactive analysis module 118 can determine that the alert has a numerical value of +20 for the first risk factor. However, if the information contained in an alert indicates that the alert is associated with a non-production environment, then the proactive analysis module 118 can determine that the alert has a numerical value of 0 for the first risk factor.

In an embodiment, and for each alert identified in step 210, proactive analysis module 118 may determine a numerical value for each risk factor and sum the numerical values for all risk factors to generate a risk score.

As an example, let it be assumed that the proactive analysis module 118 assigns the following numerical values to the two different options for each risk factor as defined above:

(1A) Production environment=+20;
(1B) Non-production environment=0;
(2A) Storage resource and/or host associated with the alert was escalated for attention in the last 24 hours=+20;
(2B) Storage resource and/or host associated with the alert was not escalated for attention in the last 24 hours=0;
(3A) There was latency impact on the storage resource associated with the alert=+25;
(3B) There was no latency impact on the storage resource associated with the alert=0;
(4A) Alert was ongoing and active for at least 30 minutes=+10;
(4B) Alert was not ongoing and not active for at least 30 minutes=+0;
(5A) Alert was generated during business hours=+15;
(5B) Alert is not generated during business hours=0;
(6A) Alert is associated with an internal application=0; and
(6B) Alert is associated with a client facing application=+10.

Based on the numerical values used above for each of the six different risk factors, latency is weighted as the most important risk factor, while production environment and escalation for attention in the last 24 hours are weighted as the second most important risk factors. Additionally, ongoing activity and the type of application (e.g., internal or client facing application) are the least important risk factors in this example. The example weighting as described above is for illustrative purposes only, and it is expressly contemplated that any weighting may be utilized according to the one or more embodiments as described herein.

Figure 4A:
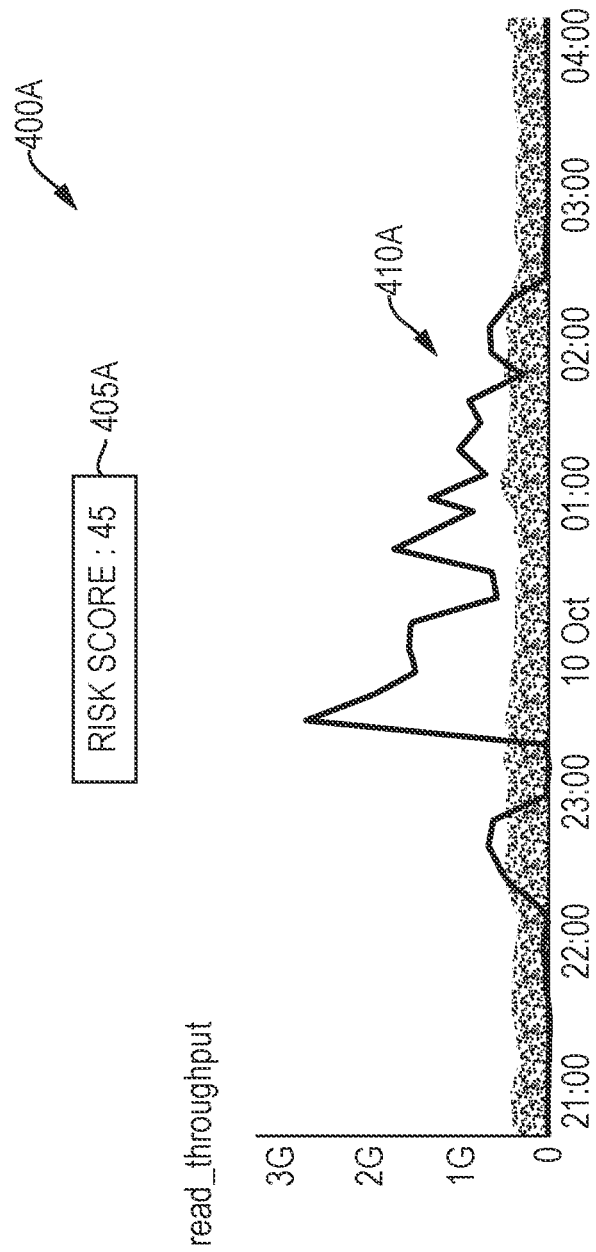
FIG. 4A is an example graphical user interface that includes a risk score generated according to the one or more embodiments as described herein.

FIG. 4A is an example graphical user interface that includes a risk score generated according to the one or more embodiments as described herein. The graphical user interface 400A of FIG. 4A may be displayed on a display screen of client device 110. For the example of FIG. 4A, let it be assumed that an alert is generated for read throughput at a storage array of enterprise storage 114. For this example, let it be further assumed that the information contained in the generated alert indicates that the alert is based on an issue in a production environment (e.g., +20), occurred during business hours (e.g., +15), and is associated with a client facing application (e.g., +10). Additionally, let it be assumed that the information contained in the generated alert indicates that there was no escalation within the past 24 hours (e.g., 0), the issue corresponding to the alert did not impact latency (0), and the alert was not ongoing for at least 30 minutes (e.g., 0). Therefore, the proactive analysis module 118 may sum the individual values for each risk factor and determine that the risk score for the alert in this example is 45 (e.g., 20+15+10).

According to the one or more embodiments as described herein, the proactive analysis module 118 may display a text box 405A, which includes the risk score of 45, in the graphical user interface 400A of FIG. 4A. Additionally, the proactive analysis module 118 may display a linear graph 410A that indicates the read throughput at the storage array over time. For example, the y-axis of the linear graph 410A represents the read throughput in terms of gigabytes while the x-axis of the linear graph represents time.

Figure 4B:
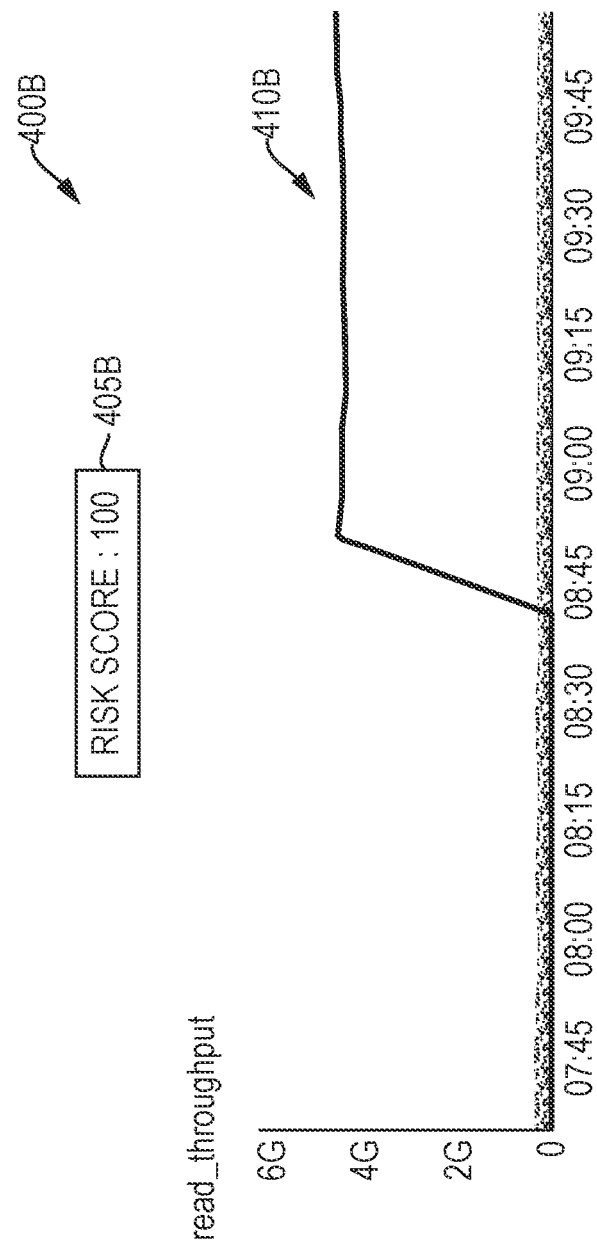
FIG. 4B is a different example graphical user interface that includes a different risk score generated according to the one or more embodiments as described herein.

FIG. 4B is a different example graphical user interface that includes a different risk score generated according to the one or more embodiments as described herein. The graphical user interface 400B of FIG. 4B may be displayed on a display screen of client device 110. For the example of FIG. 4B, let it be assumed that the different alert is generated for read throughput at a different storage array of enterprise storage 114. For this example, let it be further assumed that the information contained in the different generated alert indicates that the alert is based on an issue in a production environment (e.g., +20), occurred during business hours (e.g., +15), and is associated with a client facing application (e.g., +10). Additionally, let it be assumed that the information contained in the different alert indicates that there was escalation within the past 24 hours (e.g., +20), the issue corresponding to the different alert impacted latency (+25), and the different alert was ongoing for at least 30 minutes (e.g., +10). Therefore, the proactive analysis module 118 may sum the individual values for each risk factor and determine that the risk score for the different alert in this example is 100 (e.g., 20+15+10+20+25+10).

The proactive analysis module 118 may display a text box 405B, which includes the risk score of 100, in the graphical user interface 400B of FIG. 4B. Additionally, the proactive analysis module 118 may display a linear graph 410B that indicates the read throughput at the storage array over time. The y-axis of the linear graph 420 in FIG. 4B represents the read throughput in terms of gigabytes while the x-axis of the linear graph represents time.

Although the examples as used herein generate the risk score based on particular risk factors and assigned numerical values, it is expressly contemplated that the risk score according to the one or more embodiments as described herein may be generated utilizing a risk algorithm that considers any of a variety of different risk factors with assigned numerical values. As such, the risk factors and assigned numerical values as used herein are for illustrative purposes only.

The risk score, which is generated according to the one or more embodiments as described herein, may be utilized to determine if proactive analysis is required and/or one or more remediations need to be implemented to prevent a future potential disruption in services as will be described in further detail below.

Referring back to FIG. 2, the procedure continues from step 215 to step 220. At step 220, the proactive analysis module 118 determines if a particular risk score that corresponds to a particular alert meets a predefined criterion. For simplicity and ease of understanding, the example as described herein may refer to determining if a single risk score, generated at step 215, meets a predefined criterion. However, it is expressly contemplated that the proactive analysis module 118 may determine, serially or in parallel, if each of the risk scores generated in step 215 meets the predefined criterion.

In an embodiment, the predefined criterion may be that a particular risk score is the highest risk score of all the risk scores generated in step 215. In a different embodiment, the predefined criterion may be that a particular risk score is equal to or greater than a predetermined threshold value. In an embodiment, the predetermined threshold value may be 75. Although reference is made to the predefined criterion being a highest risk score or being based on utilization of a predetermined threshold value, it is expressly contemplated that any of a variety of different predefined criteria may be utilized according to the one or more embodiments as described herein.

If the proactive analysis module 118 determines that the particular risk score does not meet the predefined criterion at step 220, the procedure continues to step 225. At step 225, the proactive analysis module 118 determines alert amplification is not required, and then the procedure ends at step 230. The procedure 200 may then be repeated for one or more next times. For example, if the procedure 200 is configured to be performed every 5 minutes, the procedure 200 may be performed again at the next 5 minute interval.

Figure 5:
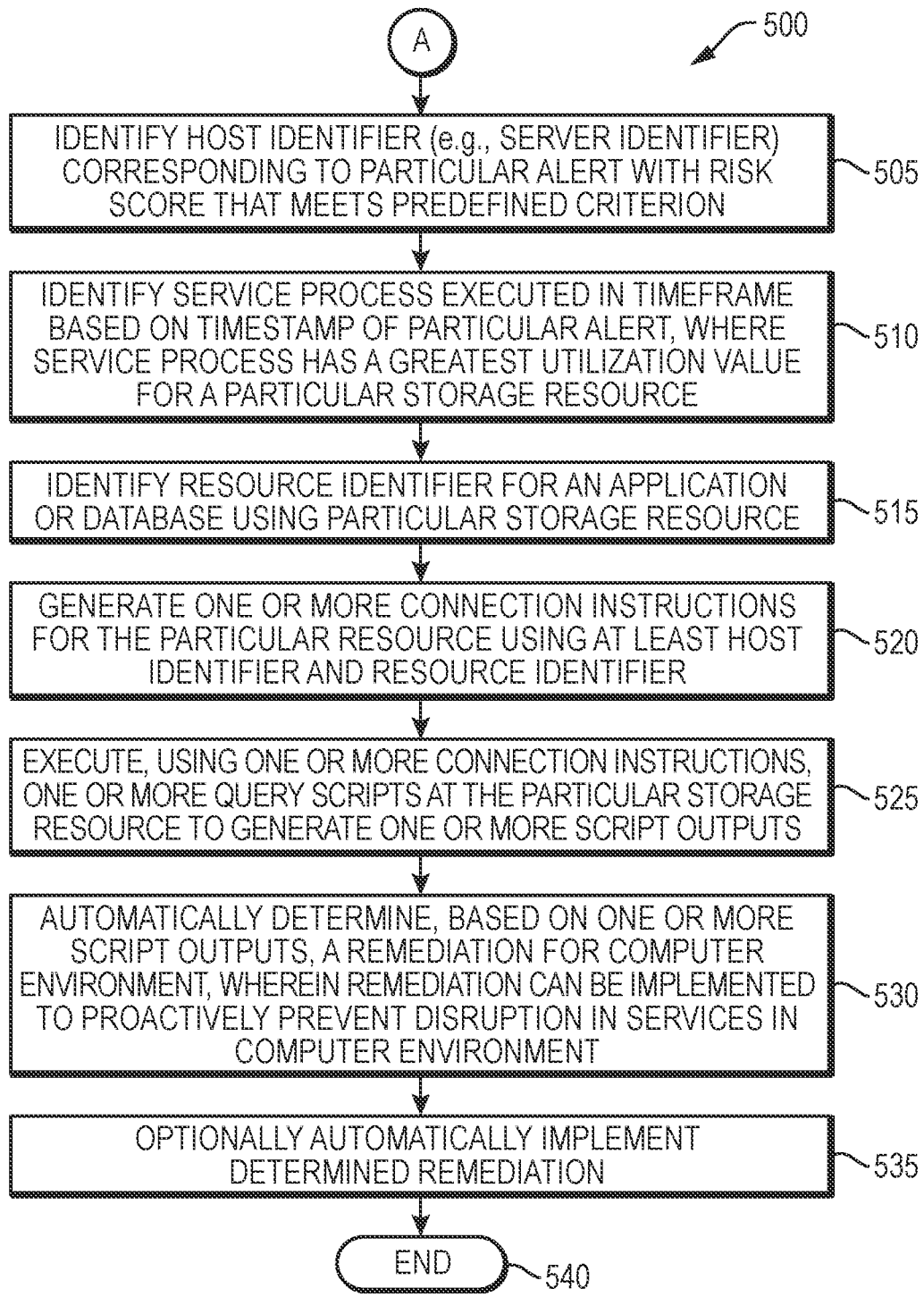
FIG. 5 is a flow diagram of a sequence of steps for performing proactive analysis of a computer environment according to the one or more embodiments as described herein.

If the proactive analysis module 118 determines that the particular risk score meets the predefined criterion at step 220, the procedure continues from step 220 to step 505 of procedure 500 of FIG. 5. FIG. 5 is a flow diagram of a sequence of steps for performing proactive analysis of a computer environment according to the one or more embodiments as described herein. As will be explained in further detail below, the particular risk score meeting the predefined criterion may indicate that alert amplification and proactive analysis are required to determine one or more remediations that can be implemented to prevent a future potential disruption in services at enterprise side 104.

At step 505, the proactive analysis module 118 identifies a host identifier (e.g., server identifier) corresponding to the particular alert with a risk score that meets the predefined criterion. In an embodiment, the proactive analysis module 118 identifies the host identifier from the alert.

For example, the proactive analysis module 118 may analyze the alert to identify a particular field in the alert. The proactive analysis module 118 may then identify the host identifier that is stored with the particular field that is identified. For example, and referring to the alert 300 of FIG. 3, the proactive analysis module 118 may syntactically analyze alert 300. Based on the syntactical analysis, the proactive analysis module 118 may identify "entity", at the sixth line of alert 300, that corresponds to entity field 330.

Based on the identification of entity field 330, the proactive analysis module 118 may determine that the identifier that follows the colon that is adjacent to the entity field 330 is the host identifier.

As such, and in this example, the proactive analysis module 118 determines that HostA is the host identifier for alert 300 of FIG. 3. Although alert 300 includes an identifier of "entity" that is used to identify entity field 330 and then subsequently identify the corresponding host identifier, it is expressly contemplated that any of a variety of different identifiers can be used for an entity field that stores a corresponding host identifier. For example, an alert generated by a different alert generation system may utilize a different identifier (e.g., "host", "server host", etc.) to signify or denote that a particular line of an alert stores a corresponding host identifier for the alert. As such, the use of "entity" at the sixth line of alert 300 to identify the corresponding host of HostA is for illustrative purposes only.

The procedure continues from step 505 to step 510. At step 510, the proactive analysis module 118 identifies a service process executed in a timeframe based on a timestamp of the particular alert. In an embodiment, the identified service process has a greatest utilization value for a particular storage resource. For example, the greatest utilization may be a maximum throughput at the particular storage resource. In an embodiment, the proactive analysis module 118 may access one or more statistical reports that are generated for the computer environment, e.g., enterprise side 104, for a timeframe that corresponds to the timestamp for the alert that meets the predefined criterion. For example, the proactive analysis module 118 may identify the timestamp corresponding to the timestamp field 320 of alert 300 of FIG. 3. The proactive analysis module 118 may add and subtract a predetermined length of time from the timestamp to determine the timeframe. The proactive analysis module 118 may then obtain the one or more statistical reports that are generated for the computer environment for its operation during the timeframe.

In an embodiment, a statistical report may describe the operation of enterprise hosts 112, enterprise switches 113, and/or the enterprise storage 114 of enterprise side 104. For example, the statistical report may describe the read and/or write throughput from the host identified at step 505 to one or more arrays of enterprise storage 114 during the timeframe. As will be described in further detail below, the proactive analysis module 118 may access the statistical report to identify a service process with a greatest utilization at a particular storage resource (e.g., storage array) during the timeframe.

Figure 6:
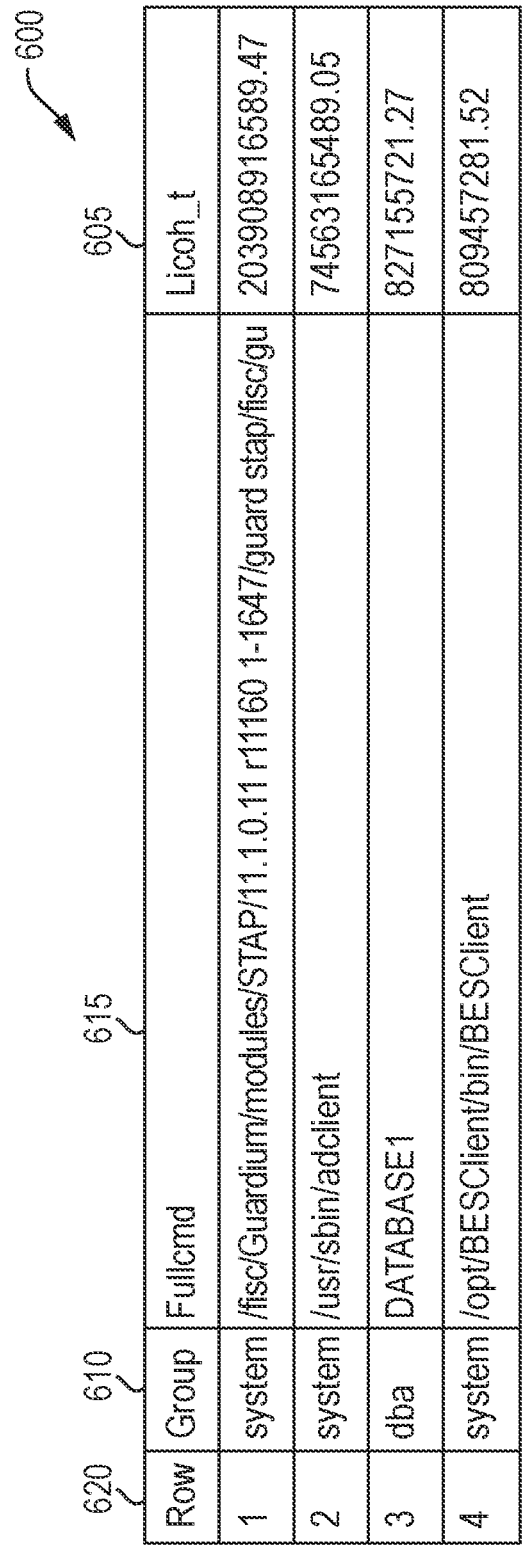
FIG. 6 is an example statistical report that may be accessed to identify a service process with a greatest utilization at a particular storage resource over a timeframe according to the one or more embodiments as described herein.

FIG. 6 is an example statistical report 600 that may be accessed to identify a service process with a greatest utilization at a particular storage resource over the timeframe according to the one or more embodiments as described herein. For simplicity and ease of understanding, the statistical report 600, e.g., a data structure, of FIG. 6 only includes four rows. However, it is expressly contemplated that the statistical report according to the one or more embodiments as described herein can have many more rows.

Statistical report 600 may include a row column 620 that includes a row identifier that corresponds to a different service process that executes in the computer environment during the timeframe. Each of the four rows in statistical report 600 may correspond to a different service process executing in the computer environment. Further, each row may have corresponding columns that store information relating to the service process of that row. For example, statistical report 600 may include Lioch_t column 605 that may indicate the logical I/O characters over time. Further, statistical report 600 may include group column 610 that may indicate a type of a service process of the row. For example, the service process may be a system process (e.g., "system"), a database process (e.g., dba), etc. Moreover, statistical report 600 may include fullcmd column 615 that indicates or provides details regarding the service process of the row. In an embodiment, the statistical report 600 may correspond to a single host, e.g., HostA, of enterprise hosts 112 of enterprise side 104. That is, each statistical report according to the one or more embodiments as described herein may include a plurality of service processes for the host identified at step 505 and that occurred during the determined timeframe.

For simplicity and ease of understanding, statistical report 600 of FIG. 6 only includes columns 605-620. However, it is expressly contemplated that the statistical report according to the one or more embodiments as described herein may include additional columns that include other information for the service process of a row. As such, statistical report 600 of FIG. 6 is for illustrative purposes only.

According to the one or more embodiments as described herein and as depicted in FIG. 6, the rows of statistical report 600 may be ordered with the highest value in Lioch_t column 605 being the first row in statistical report 600 and the lowest value in Lioch_t column 605 being the last row in statistical report 600. Therefore, the highest running processes in terms of throughput are included at the top of the statistical report 600 while the lowest running processes in terms of throughput are included at the bottom of the statistical report 600.

According to the one or more embodiments as described herein, the proactive analysis module 118 may identify the service process that is the highest running process for a storage resource, e.g., storage array, in the computer environment. Because the statistical report 600 is ordered in terms of highest running processes, the proactive analysis module 118 may identify the first row, from top to bottom, that corresponds to a storage resource. For example, the proactive analysis module 118 may analyze group column 610 and identify the first row in statistical report 600 that has a corresponding storage resource identifier, e.g., "dba", in group column 610. In this example, row 3 of statistical report 600 has a computer resource identifier of "dba", which may stand for a database administrator group identifier, in group column 610.

Therefore, and in this example, the proactive module 118 determines that the service process that is identified in row 3 of statistical report 600 is the service process for a storage resource that has a highest throughput during the timeframe. That is, even though the values in Licoh_t column 610 for the service processes of rows 1 and 2 are greater than the value for the service process of row 3, the service processes of rows 1 and 2 are system service processes and are not computer storage service processes, e.g., a service process associated with a storage array. Therefore, the proactive analysis module 118 identifies the service process of row 3 instead of the service processes of either row 1 or row 2.

The procedure continues from step 510 to step 515. At step 515, the proactive analysis module 118 identifies a resource identifier for an application or database using the particular storage resource corresponding to the service process identified in step 510. Continuing with the example of FIG. 6, the proactive analysis module 118 determines that the service process of row 3 is the service process for a computer resource that has a highest throughput. As such, the proactive analysis module 118 may syntactically analyze the entry from fullcmd column 615 that corresponds to row 3 of the statistical report 600. In this example, and based on the analysis, the proactive analysis module 118 may identify the database identifier of DATABASE1 in the fullcmd column 615 for row 3. In this example, Omega may represent an example manufacturer of the database identified by DATABASE1.

Therefore, the proactive analysis module 118 can determine, based on a risk score for an alert that exceeds a threshold, a storage resource (e.g., database DATABASE1) with a highest throughput during a timeframe that corresponds to a timestamp of the alert.

The procedure continues from step 515 to step 520. At step 520, the proactive analysis module 118 generates one or more connection instructions for the particular storage resource using at least the host identifier (identified in step 505) and the resource identifier (identified in step 515). In an embodiment, the proactive analysis module may access a configuration data structure (e.g., configuration file) associated with the computer resource, e.g., database DATABASE1, identified in step 515. For example, the configuration file may define addresses (e.g., database addresses) for establishing connections to the computer resource. The following text may represent an example portion of a configuration file for database DATABASE1:

DATABASE1_SITE1=(DESCRIPTION=(ADDRESS=
   (PROTOCOL=TCP)(HOS  T=HostA.Example.com)
   (PORT=1234))(CONNECT_DATA=
   (SERVER=DEDICATED)
   (SERVICE_NAME=DATABASE1_SITE1)
   (INSTANCE_NAME=DATABASE1)))

In an embodiment, the proactive analysis module 118 may syntactically analyze the above portion of the configuration file and identify PORT=1234 that indicates that the port used to connect HostA to database DATABASE1 is port 1234. Additionally, the proactive analysis module 118 may syntactically analyze the above portion of the configuration file and identify other configuration information such as, but not limited to. In an embodiment, the proactive analysis module 118 may generate a connection instruction using the identified port and configuration information. An illustrative connection instruction for database DATABASE1, based on the portion of the configuration file above, may be: sqlplus username@databasename.

Referring back to FIG. 5, the procedure continues from step 520 to step 525. At step 525, the proactive analysis module 118 executes, using one or more connection instructions, one or more query scripts at the particular computer resource to generate one ore script outputs.

For example, the proactive analysis module 118 may execute a top statement query script that generates a report for database DATABASE1 that identifies the top read statement from all read statements issued from HostA to database DATABASE1. The proactive analysis module 118 may use the identified top read statement to then execute a statement ID history query script by connecting to database DATABASE1 and obtaining the statement ID history and corresponding information for the top read statement. The proactive analysis module 118 may then execute a statement plan query script, using the statement ID history and corresponding information output from the statement ID history query script, to identify a plurality of different execution plans that were previously used to execute the top read statement from HostA at database DATABASE1. In an embodiment, an execution plan, i.e., query plan, describes the sequence of steps that are taken to access (i.e., read) or modify (i.e., write) data at a storage resource (e.g., database). Stated differently, the query itself, such as a read request, is indicative of what action should happen at the storage resource, while the query plan is indicative of the steps that need to be taken to perform the action at the storage resource.

As such, and in this example, execution of the query scripts results in the generation of one or more script outputs that includes at least a plurality of different execution plans that were previously used to execute the top read statement at database DATABASE1.

Therefore, and according to the one or more embodiments as described herein, an alert with a risk score that meets a predefined criterion can be amplified to identify a service process from a host to a storage resource that has great utilization in a timeframe that corresponds to the alert. As a result, the identified host and storage resource can be used to generate the above described query scripts to, for example, identify a plurality of different query plans for a top request directed from the host to the storage resource.

Referring back to FIG. 5, the procedure continues from step 525 to step 530. At step 530 the proactive analysis module 118 automatically determines, based on the one or more script outputs, a remediation that can be implemented to proactively prevent disruption in services in the computer environment. For example, the proactive analysis module 118 may determine a particular query plan of the plurality of different query plans for the top read request as will be described in further detail below.

FIG. 7 is an example script output 700 that includes a plurality of different query plans for a storage resource according to the one or more embodiments as described herein. As depicted in FIG. 7, there are 5 different query plans, i.e., execution plans. Each of the different plans may have a unique hash value stored in plan hash value column 705 of script output 700. Execs column 710 includes a value for a number of executions performed for each of the 5 query plans. ETIME exec column 715 may include a value for an execution time per execution. Further, ID column 720 includes an identifier for a statement (e.g., read statement) that, for example, is directed to a particular storage resource (e.g., DATABASE1). For example, ID column 720 may store a SQL query ID corresponding to the top read statement. Thus, script output 700 includes different query plans that correspond to the top read statement issued to database DATABASE1.

The proactive analysis module 118 may identify the single execution plan, of the different execution plans included in FIG. 7, that has the smallest execution time per execution value in column ETIME exec 715. The proactive module 118 may determine that the execution plan with the smallest execution time per execution is the best plan (i.e., remediation) for the top read request directed to database DATABASE1. Therefore, and in this example, the proactive analysis module 118 identifies the first execution plan, which has a plan hash value of 2217851470, as the best execution plan of all execution plans for the top read statement executed at database DATABASE1.

Therefore, the alert with a risk score that meets a predefined criterion can be amplified to determine a best execution plan for a top statement that is directed to a storage resource in the manner described above and according to the one or more embodiments as described herein.

As another example, the proactive analysis module 118 may execute the top statement query script and the statement ID history query script as described above. Instead of executing the statement plan query script, the proactive analysis module 118 may then execute a tuning advisor script using the statement IDs identified from execution of the statement ID history query. Based on the execution of the tuning advisor script, a report may be generated that provides possible issues and solutions as an index, stale stats, etc. The generated report may include solutions that include, but are not limited to, (1) flipping rows and columns of the particular storage resource that is a database table, (2) indicating that one or more indexes, used to query the database table, are missing, (3) executing a full table scan of the database table, and (4) identify a query plan, used to query the database table, as inefficient. In an embodiment, the generated report may be provided to a particular enterprise group as part of an alert escalation.

In an embodiment, a solution from the output of the tuning advisor script may be implemented as a remediation to prevent a future potential disruption in services in the computer environment, e.g., enterprise side 104.

Although the two above examples describe the proactive analysis module 118 executing particular query scripts to identify information that may be implemented as a remediation to prevent potential disruption in services in the computer environment, e.g., enterprise side 104, it is expressly contemplated that a variety of different query scripts may be executed in relation to a computer resource (e.g., database DATABASE1) identified as described herein and in relation to FIGS. 2 and 5. As such, the example query scripts are for illustrative purposes only.

Procedure 500 optionally continues from step 530 to step 535. At optional step 535, the proactive analysis module 118 automatically implements a determined remediation. For example, the proactive analysis module 118 may identify the first query plan in the script output 700 as described above. The proactive analysis module 118 may provide one or more commands to HostA of enterprise hosts 112 indicating that when the top read request is received from client device 110, HostA should use the first query plan when executing the top read request at database DATABASE1. Based on the implementation of the first query plan, which is determined as the best query plan, a future disruption in services in the computer environment is proactively avoided. Procedure 500 then ends at step 540.

Therefore, and according to the one or more embodiments as described herein, an alert with a risk score that meets a predefined criterion can be utilized and amplified to determine a remediation (e.g., solution or query plan) that can be implemented in a computer environment to proactively prevent a future disruption in services in the computer environment. Because the one or more embodiments as describe herein relate to techniques to proactively preventing and avoiding disruption in services in a computer environment, the one or more embodiments as described herein provide an improvement in the existing technological field of computer environments (e.g., tuning applications that operate in storage where there is a cross-correlation between storage and database knowledge). Further, because the one or more embodiments as described herein relate to determining a risk score, corresponding to an alert, which can be utilized to determine which remediation is best for proactively preventing a disruption in services, the one or more embodiments as described herein provide a practical solution (e.g., practical application) to an existing problem inherent to computer environment technology and, specifically, database application used in different computer environments.

It should be understood that a wide variety of adaptations and modifications may be made to the techniques. For example, the steps of the flow diagrams as described herein may be performed sequentially, in parallel, or in one or more varied orders. As another example, the one or more embodiments as described herein may be applicable to cloud-based environments (e.g., cloud-based storage environments) that, for example, host different applications. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a non-volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer implemented method for amplified proactive analysis of an enterprise computer environment, the method comprising:
   obtaining one or more alerts, wherein each alert provides an indication of at least one of input or output workloads at one or more computer resources of the enterprise computer environment;
   generating, for each of the one or more alerts, a risk score based on a risk algorithm, wherein the risk score provides an indication regarding a potential future disruption in services for the one or more computer resources;
   determining that a particular risk score corresponding to a particular identified alert meets a predefined criterion;
   identifying, from one or more data structures, a server identifier for a server corresponding to the particular identified alert;
   identifying, from the one or more data structures, a service process executed in a timeframe that is based on a timestamp of the particular identified alert, wherein the one or more data structures indicate that the service process has a greatest utilization for a particular computer resource of the one or more computer resources;
   identifying, from the one or more data structures, a resource identifier of the particular computer resource;
   generating a connection instruction for the particular computer resource using at least the server identifier and the resource identifier;
   executing, using the connection instruction, one or more query scripts at the particular computer resource to generate one or more script outputs; and
   determining, automatically and based on the one or more script outputs, a remediation for the particular computer resource, wherein the remediation is one of a plurality of different available remediations, and wherein the remediation is implemented to proactively prevent disruption in services at the one or more computer resources.

2. The computer implemented method of claim 1, wherein the one or more computer resources include one or more of a storage device, a computer switch, a host computer, or a computer database.

3. The computer implemented method of claim 1, wherein a selected identified alert is one of (1) an active storage read alert that exceeds a read throughput threshold value, (2) a write throughput alert that exceeds a write throughput threshold value, or (3) a change in read or write behavior associated with the selected identified alert when the selected identified alert does or does not cross a static threshold.

4. The computer implemented method of claim 1, wherein a selected identifier alert includes one or more of (1) an alert identifier that uniquely identifies the selected identifier alert, (2) an alert source identifier that identifies a source that generates the selected identifier alert, (3) a severity field that indicates a severity level corresponding to the selected identifier alert, (4) a timestamp field that indicates a particular timestamp when the selected identifier alert is generated, (5) an entity identifier that uniquely identifies a selected enterprise computer resource for which selected identifier alert is generated, and (6) an entity name corresponding to the selected enterprise computer resource for which the selected identifier alert is generated.

5. The computer implemented method of claim 1, wherein the risk algorithm is based on a plurality of risk factors for a selected identifier alert and the plurality of risk factors include a plurality of (1) a duration of the selected identifier alert, (2) whether the selected identifier alert was generated for a production or non-production environment, and (3) whether the selected identifier alert impacts latency for data storage or retrieval from the one or more computer resources.

6. The computer implemented method of claim 1, wherein the server is computer hardware, computer software, or a combination of the computer hardware and the computer software.

7. The computer implemented method of claim 1, further comprising:
   using the server identifier to access a configuration data structure for the particular computer resource;
   identifying a port and configuration information from the configuration data structure; and
   generating the connection instruction using the port and the configuration information.

8. The computer implemented method of claim 1, wherein the plurality of available remediations include (1) flipping rows and columns of the particular computer resource that is a database table, (2) indicating that one or more indexes, used to query the database table, are missing, (3) executing a full table scan of the database table, and (3) identify a query plan, used to query the database table, as inefficient.

9. A system for amplified proactive analysis of an enterprise computer environment, the system comprising:
   a memory; and
   a processor coupled to the memory, the processor executing a software module configured to:
   obtain one or more alerts, wherein each alert provides an indication of at least one of input or output workloads at one or more computer resources of the enterprise computer environment;
   generate, for each of the one or more alerts, a risk score based on a risk algorithm that considers a plurality of risk factors, wherein the risk score provides an indication regarding a potential future disruption in services for the one or more computer resources;

determine that a particular risk score corresponding to a particular identified alert meets a predefined criterion;

identify, from one or more data structures, a server identifier for a server corresponding to the particular identified alert;

identify, from the one or more data structures, a service process executed in a timeframe that is based on a timestamp of the particular identified alert, wherein the one or more data structures indicate that the service process has a greatest utilization for a particular computer resource of the one or more computer resources;

identify, from the one or more data structures, a resource identifier of the particular computer resource;

generate a connection instruction for the particular computer resource using at least the server identifier and the resource identifier;

execute, using the connection instruction, one or more query scripts at the particular computer resource to generate one or more script outputs; and determine, automatically and based on the one or more script outputs, a remediation for the particular computer resource, wherein the remediation is one of a plurality of different available remediations, and wherein the remediation is implemented to proactively prevent disruption in services at the one or more computer resources.

10. The system of claim 9, wherein the one or more computer resources include one or more of a storage device, a computer switch, a host computer, or a computer database.

11. The system of claim 9, wherein a selected identified alert is one of (1) an active storage read alert that exceeds a read throughput threshold value, (2) a write throughput alert that exceeds a write throughput threshold value, or (3) a change in read or write behavior associated with the selected identified alert when the selected identified alert does or does not cross a static threshold.

12. The system of claim 9, wherein a selected identifier alert includes one or more of (1) an alert identifier that uniquely identifies the selected identifier alert, (2) an alert source identifier that identifies a source that generates the selected identifier alert, (3) a severity field that indicates a severity level corresponding to the selected identifier alert, (4) a timestamp field that indicates a particular timestamp when the selected identifier alert is generated, (5) an entity identifier that uniquely identifies a selected enterprise computer resource for which selected identifier alert is generated, and (6) an entity name corresponding to the selected enterprise computer resource for which the selected identifier alert is generated.

13. The system of claim 9, wherein the risk algorithm is based on a plurality of risk factors for a selected identifier alert and the plurality of risk factors include (1) a duration of the selected identifier alert, (2) whether the selected identifier alert was generated for a production or non-production environment, and (3) whether the selected identifier alert impacts latency for data storage or retrieval from the one or more computer resources.

14. The system of claim 9, wherein the server is computer hardware, computer software, or a combination of the computer hardware and the computer software.

15. The system of claim 9, wherein the processor is further configured to:

use the server identifier to access a configuration data structure for the particular computer resource;

identify a port and configuration information from the configuration data structure; and generate the connection instruction using the port and the configuration information.

16. The system of claim 9, wherein the plurality of available remediations include (1) flipping rows and columns of the particular computer resource that is a database table, (2) indicating that one or more indexes, used to query the database table, are missing, (3) executing a full table scan of the database table, and (3) identify a query plan, used to query the database table, as inefficient.

17. A non-transitory computer readable medium having software encoded thereon, the software when executed by one or more computing devices operable to:

obtain one or more alerts, wherein each alert provides an indication of at least one of input or output workloads at one or more computer resources of the enterprise computer environment;

generate, for each of the one or more alerts, a risk score based on a risk algorithm, wherein the risk score provides an indication regarding a potential future disruption in services for the one or more computer resources;

determine that a particular risk score corresponding to a particular identified alert meets a predefined criterion;

identify, from one or more data structures, a server identifier for a server corresponding to the particular identified alert;

identify, from the one or more data structures, a service process executed in a timeframe that is based on a timestamp of the particular identified alert, wherein the one or more data structures indicate that the service process has a greatest utilization for a particular computer resource of the one or more computer resources;

identify, from the one or more data structures, a resource identifier of the particular computer resource;

generate a connection instruction for the particular computer resource using at least the server identifier and the resource identifier;

execute, using the connection instruction, one or more query scripts at the particular computer resource to generate one or more script outputs; and determine, automatically and based on the one or more script outputs, a remediation for the particular computer resource, wherein the remediation is one of a plurality of different available remediations, and wherein the remediation is implemented to proactively prevent disruption in services at the one or more computer resources.

18. The non-transitory computer readable medium of claim 17, the software when executed by the one or more computing devices further operable to:

use the server identifier to access a configuration data structure for the particular computer resource;

identify a port and configuration information from the configuration data structure; and generate the connection instruction using the port and the configuration information.

19. The non-transitory computer readable medium of claim 17, wherein the one or more computer resources include one or more of a storage device, a computer switch, a host computer, or a computer database.

20. The non-transitory computer readable medium of claim 17, wherein a selected identified alert is one of (1) an active storage read alert that exceeds a read throughput threshold value, (2) a write throughput alert that exceeds a write throughput threshold value, or (3) a change in read or write behavior associated with the selected identified alert when the selected identified alert does or does not cross a static threshold.

* * * * *